United States Patent [19]

Hawkes

[11] 4,277,973
[45] Jul. 14, 1981

[54] VIBRATORY WIRE STRAIN GAGE

[76] Inventor: Ivor Hawkes, 5 Willow Springs La., Hanover, N.H. 03755

[21] Appl. No.: 44,696

[22] Filed: Jun. 1, 1979

Related U.S. Application Data

[63] Continuation-in-part of Ser. No. 966,324, Dec. 4, 1978, abandoned.

[51] Int. Cl.³ .................................................. G01L 1/10
[52] U.S. Cl. ............................ 73/862.41; 73/DIG. 1
[58] Field of Search .......... 73/141 R, 141 A, DIG. 1, 73/778, 704, 517 AV

[56] References Cited

U.S. PATENT DOCUMENTS

| 2,604,787 | 7/1952 | Coyne et al. | 73/DIG. 1 |
| 3,052,116 | 9/1962 | Critchley et al. | 73/778 |
| 3,914,992 | 10/1975 | Babcock | 73/778 |
| 3,935,745 | 2/1976 | Jonell et al. | 73/704 |
| 3,960,009 | 6/1976 | Roepke et al. | 73/778 |
| 4,074,565 | 2/1978 | Harris et al. | 73/778 |
| 4,165,651 | 8/1979 | Olsen et al. | 73/704 |

Primary Examiner—Anthony V. Ciarlante
Attorney, Agent, or Firm—Howard E. Sandler; E. Wallace Breisch

[57] ABSTRACT

A vibratory wire strain gage and more particularly a vibratory wire strain gage having an improved means for readily tensioning the gage wire and, if desired, adjusting such tension prior to installation.

18 Claims, 7 Drawing Figures

VIBRATORY WIRE STRAIN GAGE

This application is a continuation-in-part of U.S. patent application Ser. No. 966,324, filed Dec. 4, 1978 (now abandoned).

Strain gages of numerous types are utilized for determining the magnitude and distribution of stress and strain in all manner of constructions. Among several types that have been adopted and used by engineers are the vibratory wire strain gages and electrical resistance strain gages. The resistance gages are generally in the form of strips which are bonded directly to the measuring surface by adhesive or cement. However, resistance gages have presented numerous disadvantages, for example: they are subject to corrosion and lead wire malfunctions, particularly in harsh environments; in many instances they have proved to be subject to drift and error problems, particularly in long term installations and also because their measurements are directly affected by variations of electrical current voltage, resistance or capacitance; and in attempting to transmit the sensed signals over long distances, a tendency of error or malfunction exists because of the influence of lead wire resistance.

Because of these problems users have turned to vibratory wire strain gages, particularly in instances of adverse environments, for example, as encountered in the mining and civil engineering fields. In these instances the vibratory wire strain gages have illustrated a superior performance insofar as noted higher reliability and sensitivity as well as an operational consistency where the frequency signal may be fed through cables for remote readings at locations far from the area where the strain is being measured.

Basically vibratory wire strain gages comprise a thin wire which is anchored at its ends within a suitable housing at a predetermined tension. The housing is secured to the surface of a structure or, in embediment-type strain gages, is buried or cast into the structure to be studied. As the structure experiences a change in strain the tension in the wire varies and this change in tension is measured in a suitable manner, for example, by measuring changes in the natural frequency of the wire by inducing vibration in the wire magnetically through the use of a coil/magnet assembly operated in conjunction with an electronic circuit, all as is shown and described in U.S. Pat. Nos. 3,889,525 and 3,960,009.

In one common form of vibratory wire strain gage the elements of the gage consist of a pair of longitudinally spaced end blocks having a tubular member extending axially therebetween. The ends of the wire are clamped within respective adjacent end blocks and the end blocks are movably carried at the respective axial ends of the tube in a manner that by moving such end blocks apart, the wire becomes tensioned. When such a gage is used to measure the strains on the surface of a structure it is mounted between end brackets or welded or bolted directly to the structure with one normal procedure being to clamp one of the end blocks of the gage to an adjacent bracket, field tension the wire to a predetermined value and thereafter clamp the other end block to the other bracket to maintain this tension. This technique required that a skilled technician be present during such field installation and tensioning to insure that the wire is set with an appropriate tension for initially the wire was slack and in most vibratory wire strain gages a tension must be set, for example 2 pounds, before readings can be obtained. Furthermore, it is often difficult to judge the forces being applied to the wire, particularly under field conditions, and, as such, it is not uncommon during the utilization of such prior field set gages, for the wire to be broken during the setting operations.

The problems associated with totally field tensioning the wire in vibratory wire strain gages has been recognized in U.S. Pat. No. 4,074,565. This patent illustrates an arrangement where the tensioning is done during factory assembly by inserting the wire through a body tube, tensioning the wire and crimping the ends of the tube after the predetermined tension has been reached. The tube is secured to a mounting plate which is spot welded to the surface of the structure for which the strain is to be determined. This alternative is defective in several areas, for example: the crimping arrangement is not totally accurate and is not readily adjustable in a scientific manner (i.e. the patent discusses relieving excessive tension in the wire by rapping the end of the tube); and because the entire tube must be elongated or contracted by the transmitted stress, the generated load can cause significant distortion of the anchor plate and a resultant loss of strain sensitivity of the gage. Furthermore, this arrangement is not readily adaptable should it be required to change the predetermined wire tension in the field.

In recognition of the above problems, one form of the present invention includes a wire clamped permanently between a pair of axially spaced anchor blocks. A tube of non-magnetic material surrounds the wire and extends freely between the anchor blocks. An adjustable biasing means is carried by or cooperative with the tube to be operable to provide a selectively adjustable biasing force on one anchor block to tension the wire to a preferred value. This operation may be accomplished in the shop. Furthermore, if desired, field adjustments of the wire tension may be easily made without structural alterations of the gage. Still further, the sensed strain will be transmitted to the wire independently of the tube, thus alleviating potential distortion problems as were mentioned hereinabove. The invention herein is equally applicable to both surface mounted and embediment-type wire strain gages with appropriate structural adjustments being made thereto to compensate for the differing physical and environmental characteristics.

Accordingly, it is one object of this invention to provide a surface or embediment-type vibratory wire strain gage where the wire tension may be easily set in the shop.

It is another object of this invention to provide a surface or embediment-type vibratory wire strain gage wherein, if desired, the predetermined wire calibration may be easily adjustable in the field.

A still further object of this invention is to provide a surface-type vibratory wire strain gage in which only the mounting points are loaded by the change in wire tension produced in response to the strain of the structure to which the gage is affixed.

A further object of this invention is to provide a surface or embediment-type vibratory wire strain gage wherein the axial stiffness of the adjusting means is relatively low so that minimum resistance is applied by it in the working environment of the strain gage.

These and other objects of the present invention will become more readily apparent upon a review of the following description and drawings in which.

Figure 1:
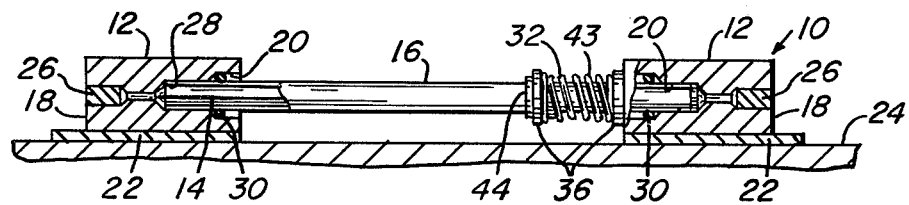
FIG. 1 is a side elevational view, partially in cross-section, of a vibratory wire strain gage constructed in accordance with the principles of the present invention.
Figure 2:
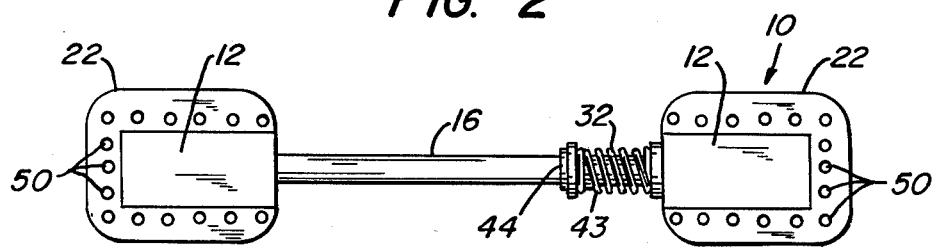
FIG. 2 is a plan view of the strain gage illustrated in FIG. 1.
Figure 3:
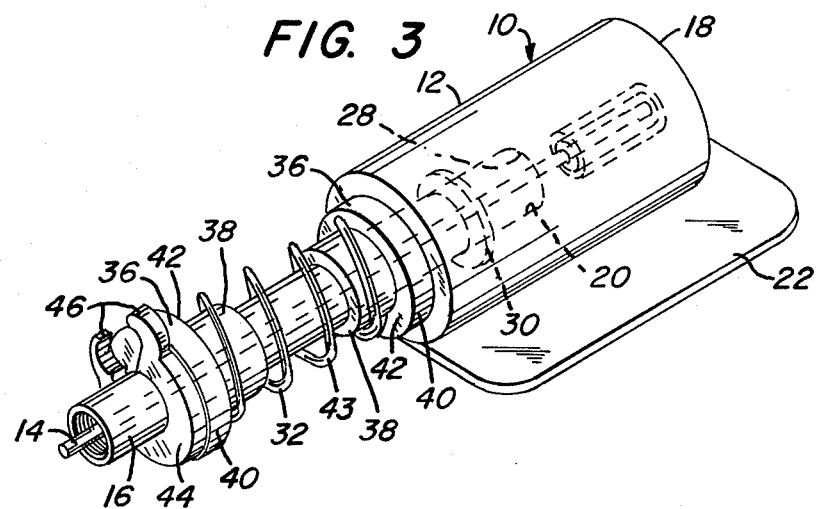
FIG. 3 is an enlarged perspective view of an end portion of the strain gage in FIG. 1 which more clearly illustrates the calibration or wire tensioning means.

FIGS. 1 through 3 illustrate an elongated vibratory wire strain gage 10 of the present invention which comprises: a pair of axially spaced anchor blocks 12; a length of vibratory wire 14 of high tensile steel or the like which extends axially between the blocks 12 and has the respective axial ends thereof firmly secured to blocks 12; and an elongated tube 16 of non-magnetic material through which the wire 14 passes. The axial ends of the tube 16 are carried within the respective anchor block 12 adjacent thereto. Each anchor block 12 includes a body member 18 having a multi-stepped axially extending through bore 20 therethrough and a flange 22 adjacent the lower end of body member 18 for securing the block 12 to the surface 24 of a structure for which strain variation is to be determined.

In assembly, wire 14 is received through tube 16 and these elements are coaxially aligned with the bores 20 of body members 18. The axial end portions of wire 14 are clamped within the respective axially outermost portions of bores 20 in any suitable manner; for example through the use of short lengths of stainless steel capillary tubing 26 which are squeezed into the outermost portions of respective bores 20 and onto wire 14 by a suitable punch which axially loads the capillary tubing to a very high pressure. An axially inner portion of bores 20 are of a diameter to slidably receive the respective inner end of tube 16 therewithin. These inner portions of bores 20 include a reduced diameter portion which forms a seat 28 to limit the projection of tube 16 within the bores 20. Suitable sealing arrangements such as "O" ring seals 30 or the like are positioned intermediate an inner peripheral portion of bore 20 and the adjacent outer peripheral portion of tube 16. Seals 30 protect the wire 14 from the external environment and also act to tighten up the tube 16 to anchor block 12 relationship.

Selectively adjustable tensioning means 32 are provided to tension the wire 14. Tensioning means 32 are positioned axially inwardly adjacent one of the anchor blocks 12, as shown in the drawings the right block 12, and comprises: a pair of axially spaced stepped cylindrical seating and guiding members 36 having a reduced diameter spring keeper portion 38, a larger diameter bearing portion 40 and a spring seat 42 at the juncture of portions 38 and 40; a spring 43 extending axially between seating members 36; and a gripping type retaining ring 44 for the selective adjustment of tensioning means 32. In assembly, as viewed in FIGS. 1 through 4, the right hand portion of tube 16 is coaxially received through tensioning means 32 in a manner that bearing portion 40 of the right side member 36 engages the axially inward face of the adjacent anchor block 12, the other member 36 is axially spaced from the right side member 36 and the bearing portion 40 thereof engages the axially outward face of retaining ring 44, and spring 43 extends between members 36 in a manner that axial end portions thereof surround the keeper portions 38 and the respective axial ends thereof engage the adjacent spring seats 42.

Tensioning means 32 provides a structure for easily and accurately adjusting the tension of wire 14 in the shop tensioning of the strain gage 10 or, if desired, for field adjustment of the tension of wire 14. Adjustments are made to tensioning means 32 by utilizing a suitable tool, such as retaining ring pliers (not shown) to spread the radially outwardly extending lugs 46 of the split retaining ring 44. The clamping force of ring 38 on tube 16 is thus relieved and the left hand member 36 is moved in an appropriate direction to either increase or decrease the compressive force on the adjacent anchor block 12. The tube 16 is relatively axially movable within the bores 20; however, inasmuch as an axial end of the tube 16 is seated on seat 28 of the left hand block 12 and that the wire 14 is firmly fixed with respect to both blocks 12, the resulting force created by spring 43 will act to directly tension the wire 14. When the desired tension in wire 14 is determined the retaining ring is released to firmly grip the tube 16 and maintain the requisite compression of spring 43. The means of inducing vibration and determining the tension in wire 14 is accomplished in any known manner, for example as described and illustrated in U.S. Pat. Nos. 3,960,009 and 3,889,525 wherein the wire 14 is vibrated by a coil magnet assembly 48 (see FIG. 4) and a vibrating wire meter is then utilized to determine the wire tension.

A significant criteria in the preferred construction of a strain gage 10 of the present invention is the relationship of the spring to wire stiffness to insure that small changes in the wire 14 length brought about by strain changes in the structure to which the gage is affixed, do not significantly change the spring 43 compression force. A critical property of the spring 43 geometry and material is that the spring 43 stiffness must be much less than the wire 14 stiffness, preferably in the range of 10 to 30. In one preferred embodiment it was determined that for a total extension of the wire 14 in a 2 inch long strain gage 10 of 0.006 inch, a ¼ inch long spring 43 was used with a stiffness of 48 lb./in. where the wire 14 diameter was 0.009 inch, thus giving a spring 43 to wire 14 stiffness ratio of approximately 20.

The strain gage 10 is operationally affixed to the surface 24 of the structure being studied in any suitable manner. Should such surface 24 be metallic it has been found convenient to spot weld the flange 22 to the anchor blocks 12. The flange 22 may be provided with circular etching marks 50 to indicate the preferred location of the spot welds of the flange 22 to the surface 24. When intended for non-metallic surfaces such as concrete or rock or metallic surfaces not suitable for spot welding, the flange 22 may be bonded to the surface 24 using any suitable cementing material.

Figure 4:
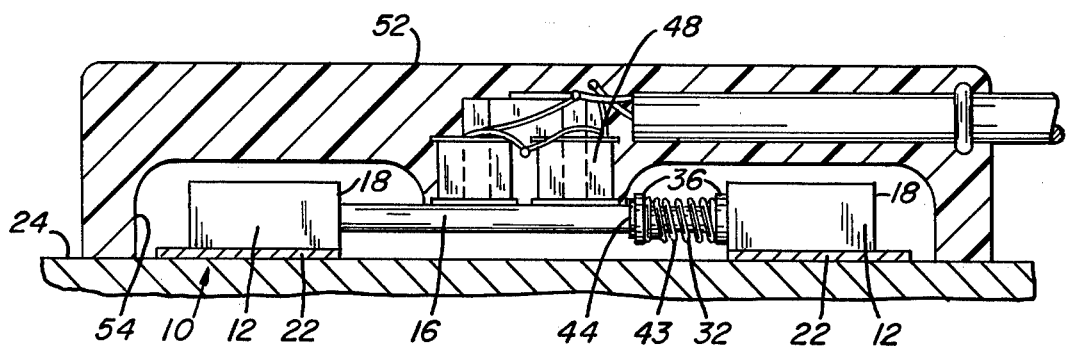
FIG. 4 is a side elevational view, partially schematic and partially in cross-section, illustrating the vibratory wire strain gage of FIG. 1 within a housing and including means for vibrating the wire and sensing the signal therefrom.

FIG. 4 illustrates one form of a strain gage 10 which additionally shows an elongated formed housing 52, such as plastic or the like, which has a formed interior area 54 for covering the strain gage 10. Housing 52 also includes a suitable coil/magnet assembly 48 encapsulated therewithin for providing vibration to wire 14 and picking up the signal therefrom for remote display. Housing 52 may also be secured to surface 24 in any suitable manner, for example by spot welding of a housing flange (not shown) to the surface 24.

Figure 5:
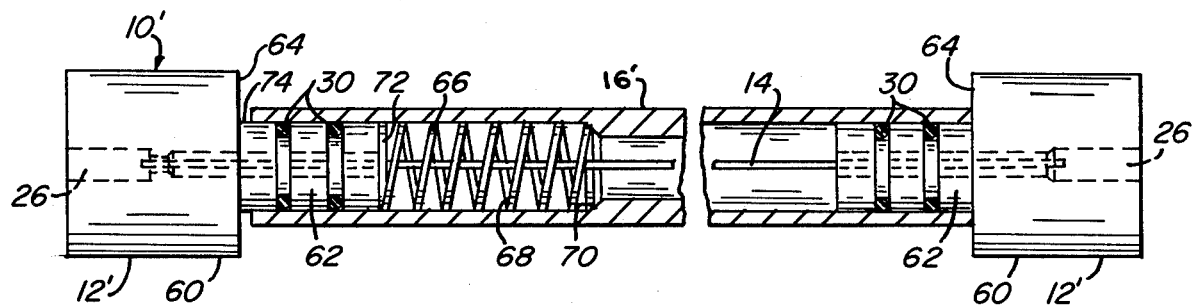
FIG. 5 is a side elevational view, partially in section, of an alternative embodiment of a vibratory wire strain gage constructed in accordance with the principles of the present invention.
Figure 6:
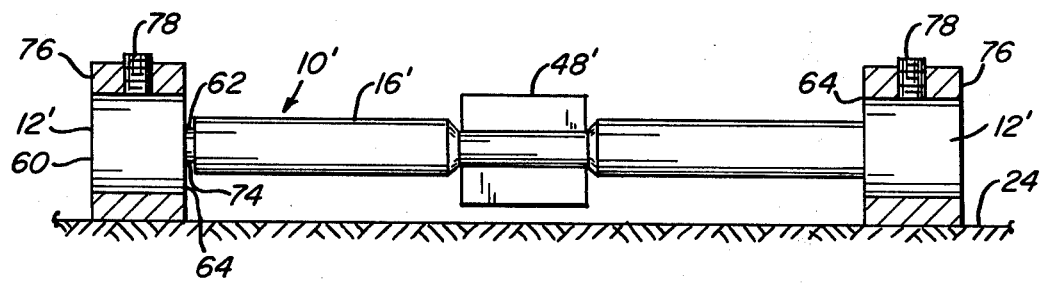
FIG. 6 is a schematic side elevational view of the gage of FIG. 5 in working position on a surface for which strain is being determined.
Figure 7:
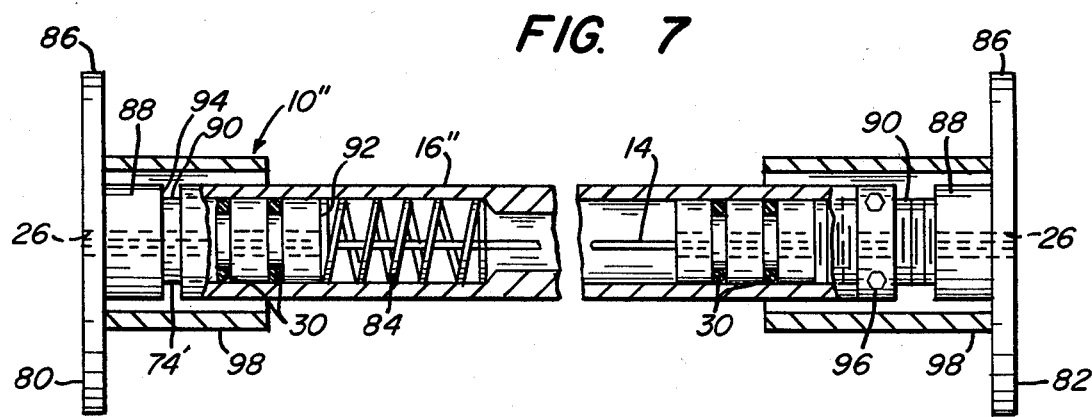
FIG. 7 is a side elevational view partially in section, of a still further embodiment of a vibratory wire strain gage of the present invention and which is of the type to be utilized in embedment-type installations.

FIGS. 5 and 6 illustrate another embodiment of a vibration wire strain gage 10' of the present invention which is of the type to be surface mounted and FIG. 7 illustrates still another embodiment of a vibratory wire strain gage 10" which is of the embedment type. Accordingly, for purposes of the description set forth hereinafter, elements of gages 10' and 10" which are similar to like elements of gage 10 will be identified by identical reference numerals primed and elements which are substantially identical to those of gage 10 will be identified by identical reference numerals.

Vibratory wire strain gage 10' includes a pair of anchor blocks 12' to which the respective axial ends of the wire 14 is secured by capillary tubing 26. The wire 14 extends through the tubing 16' which is constructed of non-magnetic material. Each anchor block 12' is formed in a generally stepped cylindrical fashion which comprises an enlarged diameter end portion 60 and a coaxial reduced diameter portion 62 which extends inwardly from portion 60 and is received within adjacent axial end portions of the tubing 16'. An annular inwardly facing bearing surface 64 is formed at the juncture of portions 60 and 62. "O" ring seals 30 or the like are positioned intermediate an inner peripheral surface of tubing 16' and an adjacent outer peripheral surface of reduced diameter portion 62 to protect the wire 14 from the external environment and also to tighten up the tube 16' to anchor block 12' relationship. Wire 14 is vibrated by a coil magnet assembly 48' mounted adjacent tubing 16' and positioned midway anchor blocks 12'.

Selectively adjustable tensioning means 66 are provided to tension the wire 14. Tensioning means 66 are positioned inwardly adjacent one of the anchor blocks 12', as shown in FIG. 5 the left block 12', and comprises a compression spring 68 which is received within tube 16' in a manner that the inner end thereof is seated on an annular seating shoulder or surface 70, which is formed in an inner peripheral portion of tube 16', and the outer end of compression spring 68 engages the inner surface 72 of portion 62 of the left block 12'. The dimensional parameters of the tube 16' to surface 70 length and the axial length of the portion 62, coupled with the length and stiffness of compression spring 68, results in one axial end of tube 16' engaging the surface 64 of the right hand block 12' and the opposite axial end of tube 16' being spaced inwardly from the surface 64 of the left hand block 12' such that a gap 74, for example 0.02 inches, exists therebetween. Furthermore, the length of wire 14 is such that when gap 74 is maintained, the wire 14 will always be in tension and be giving readings. Thus, with the embodiment illustrated in gage 10' the set reading is adjusted from an initial reading of gage 10' rather than from a no reading slack condition. With a slack condition, operators have often broken the gage wire because they were unable to obtain a reading during wire tensioning calibration, primarily because of a tendency to load the wire too rapidly for the readout meter to follow. The present invention decreases the potential of an operator breaking the gage wire for a readout always exists during tensioning.

When a gage 10' with an internal compression spring 68 is used as a surface strain gage and has the ends thereof received within end brackets 76, which are welded to surface 24, it is not necessary to set the initial tension of wire 14 to an exact value. Specifically, the gage 10' is positioned within the axially spaced right and left hand end brackets 76 and suitable means, such as set screw 78 is turned to lock the right hand anchor block 12' within the right hand bracket 76. The left hand anchor block 12' is then manually pushed relative to the left hand end bracket 76 until the desired reading is obtained and then the set screw 78 is turned to lock the left hand anchor block 12' into position within the left hand bracket 76. The zero reading is then taken and the gage is in place ready for use.

The embodiment of vibratory wire strain gage 10", as illustrated in FIG. 7, is quite similar to the gage 10' described immediately hereinabove with the primary distinction therebetween being that gage 10" is adapted for use to measure strain within concrete constructions. For such measurements, the gage 10" will generally be cast directly into the concrete and after the concrete has set, would be used to measure movements occurring along the axial length of the gage 10". The wire 14 is pretensioned in a manner described hereinafter to some predetermined value across the axial ends of tube 16" during manufacture or prior to being cast into the concrete mix and thus forms the initial or zero strain reading of the gage 10". When the concrete deforms either under the action of applied loads or by shrinkage, the complete gage 10" likewise deforms and the strain in the gage (and the concrete) is measured as a change in the wire frequency when the wire 14 is vibrated.

Similarly to gage 10', the wire strain gage 10" includes a wire 14 extending through a tube 16". The wire 14 has the axial ends thereof suitably rigidly secured to adjacent left and right side anchor blocks 80 and 82, respectively, and tensioning means 84 is provided for the selective adjustment of the tension within the wire 14.

Anchor block 80 comprises: an enlarged diameter disc-shaped end flange 86; a reduced diameter intermediate cylindrical portion 88 which extends coaxially inwardly from flange 86; and a further reduced diameter cylindrical inner portion 90 which extends coaxially inwardly from portion 88 and is received within an adjacent axial end portion tube 16". Cylindrical portion 90 provides the same general function as portion 62 and the inner surface 92 thereof engages the compression spring 68' of tensioning means 84 for the tensioning of wire 14. As illustrated, a gap 74' is maintained axially intermediate the axial end of tube 16" and the adjacent annular surface 94 which is formed at the juncture of portions 88 and 90.

The selective adjustment for tensioning means 84 is provided adjacent the right hand end of gage 10" by including an internally threaded nut 96 or the like at the respective axial end of tube 16" which cooperates with an adjacent threaded outer peripheral surface of the portion 90 of anchor block 82. In order to adjust the tension of means 84, the nut 96" is rotated clockwise or counterclockwise thus selectively increasing or decreasing, respectively, the tension in wire 14. Anchor blocks 80 and 82 additionally include hollow cylindrical cap members 98 to extend coaxially inwardly from the respective flanges 86 thereof and are spaced radially from an adjacent outer peripheral portion of the respective blocks 80 and 82 and the adjacent axial end portions of tube 16". Cap portions 98 are operable to isolate the moveable portions and the inner periphery of gage 10" from the external environment. This isolation is of particular significance when utilizing gage 10" as an embediment-type gage. If desired, cap portions 98 may be of a shrink-fit type material which will be shrunk to adhere to all adjacent surfaces to insure isolation after final tension adjustments to gage 10" are made. Furthermore, if desired cap portion 98 may be formed as rigid members and shrink wrapping or other suitable sealants may be disposed to seal off the radial gap between the inner periphery of cap portions 98 and the adjacent outer peripheral surface of tube 16".

The embodiments described hereinabove are the presently preferred embodiments and are primarily directed to a strain gage having an improved adjusting means for the tension in wire 14 which is operative to provide a definitive and readily accomplished means for shop and field wire tension adjustments. Accordingly, it is understood that various modifications may be made by those knowledgeable in the art to the preferred embodiments discussed hereinabove without departing from the scope of the invention which is defined by the claims set forth hereinafter. For example: tube 16 is illustrated as having an annular cross section, however a tubular square or rectangular cross section is contemplated; similarly, the cross sectional configuration of the anchor blocks may be altered from a circular to a square or rectangular configuration; alternative biasing means may be utilized, such as a deformable elastomeric material; other forms of retaining arrangements may be substituted for ring 44; and the like.

I claim:

1. A vibratory wire strain gage comprising: an elongated hollow tube; a vibratory wire extending longitudinally through said tube and in spaced apart relationship with the inner periphery thereof; spaced anchor blocks adjacent each axial end of said tube, said anchor blocks supporting said tube adjacent respective axial ends thereof in a manner that said tube is longitudinally slidable with respect to at least one of said anchor blocks; securing means rigidly securing the respective axial ends of said wire to adjacent ones of said anchor blocks; selectively adjustable biasing means having an axial stiffness thereof substantially less than the axial stiffness of said wire; and said biasing means being operable to bias at least one of said anchor blocks away from the other of said anchor blocks to selectively vary the tension in said vibratory wire.

2. A vibratory wire strain gage as specified in claim 1 wherein said tube, said wire and said biasing means are in coaxial relationship.

3. A vibratory wire strain gage as specified in claim 1 wherein said biasing means includes a compression spring coaxially received around a portion of said tube adjacent one of said anchor blocks and said spring communicates between said one of said anchor blocks and a keeper longitudinally spaced therefrom.

4. A vibratory wire strain gage as specified in claim 3 wherein said keeper is selectively externally adjustable longitudinally along said tube.

5. A vibratory wire strain gage as specified in claim 4 wherein said keeper is a split retaining ring having the inner periphery thereof in biased gripping relationship with an adjacent outer peripheral portion of said tube.

6. A vibratory wire strain gage as specified in claim 1 wherein said tube is longitudinally slidable with respect to both of said anchor blocks.

7. A vibratory wire strain gage as specified in claim 1 wherein said anchor blocks each include a flange portion thereon which is adapted to be secured to the surface of a structure for which strain measurements are to be determined.

8. A vibratory wire strain gage as specified in claim 7 wherein said tube is made of a non-magnetic material.

9. A vibratory wire strain gage as specified in claim 8 additionally including a housing having a formed hollowed out portion to receive all the specified elements therewithin and which is additionally adapted to be secured to such a surface.

10. A vibratory wire strain gage as specified in claim 9 additionally including a coil magnet assembly contained within said housing and cooperable with said wire to selectively provide vibration to said wire and to detect a signal therefrom for remote display.

11. A vibratory wire strain gage as specified in claim 1 wherein the ratio of the axial stiffness of said wire to the axial stiffness of said biasing means is in the range of 10 to 1 to 30 to 1.

12. A vibratory wire strain gage as specified in claim 1 wherein said biasing means includes a compression spring coaxially received within a portion of said tube adjacent one of said anchor blocks and said spring communicates between said one of said anchor blocks and seating means longitudinally spaced therefrom, said seating means being located within said tube.

13. A vibratory wire strain gage as specified in claim 12 wherein at least said one of said anchor blocks includes a portion thereof slidingly received within said tube.

14. A vibratory wire strain gage as specified in claim 13 wherein said compression spring is selectively elongated and compressed by respectively moving said one of said anchor blocks axially away from and towards said tube.

15. A vibratory wire strain gage as specified in claim 14 additionally including axially spaced end brackets each of which supports adjacent anchor blocks, said end brackets being adapted to be secured to the surface of a structure for which strain measurements are to be determined.

16. A vibratory wire strain gage as specified in claim 15 additionally including retaining means to releasably retain selective portions of at least one of said anchor blocks in the respective end bracket therefor.

17. A vibratory wire strain gage as specified in claim 14 wherein the other of said anchor blocks includes a portion thereof in coaxial threaded engagement with said tube through an internally threaded nut resting against said tube such that said one of said anchor blocks is selectively axially moved away from and towards said tube by coaxial rotation of said nut and said threaded engagement maintains the relative position of said one of said anchor blocks with respect to said tube.

18. A vibratory wire strain gage comprising: an elongated hollow tube; a vibratory wire extending longitudinally through said tube and in spaced apart relationship with the inner periphery thereof; spaced anchor blocks adjacent each axial end of said tube, said anchor blocks supporting said tube adjacent respective axial ends thereof in a manner that said tube is longitudinally slidable with respect to at least one of said anchor blocks; securing means rigidly securing the respective axial ends of said wire to adjacent ones of said anchor blocks; selectively adjustable biasing means having an axial stiffness thereof substantially less than the axial stiffness of said wire and having at least a portion thereof carried by said tube; and said biasing means being externally operable to bias at least one of said anchor blocks away from the other of said anchor blocks to selectively vary the tension in said vibratory wire.

* * * * *